W. L. STULLER.

ENGINE STARTER.

APPLICATION FILED JAN. 14, 1913.

Reissued Jan. 27, 1914. 13,681.

*WITNESSES:*

R. B. Lewis

R. E. Slaven

*INVENTOR.*

W. L. Stuller,

*BY*

Chas. F. Schmelz

*ATTORNEY.*

UNITED STATES PATENT OFFICE.

WILLIAM L. STULLER, OF DETROIT, MICHIGAN.

ENGINE-STARTER.

Specification of Reissued Letters Patent. Reissued Jan. 27, 1914.

13,681.

Original No. 1,062,516, dated July 16, 1912, Serial No. 660,452. Application for reissue filed January 14, 1913. Serial No. 742,085.

*To all whom it may concern:*

Be it known that I, WILLIAM L. STULLER, a citizen of the United States, residing at Detroit, in the county of Wayne and the State of Michigan, have invented certain new and useful Improvements in Engine-Starters, of which the following is a specification.

This invention relates to engine starters and more particularly to that class thereof generally employed in connection with hydrocarbon engines, and it has for one of its objects the provision of an improved mechanism which is operated by a fluid under pressure, said fluid preferably being compressed air.

The invention has furthermore, for its object the provision of a mechanism comprising a driving member which is adapted to be brought into coöperation with an element directly and permanently connected with the engine shaft, the organization being such that the driving member will be at first moved slowly into engagement with the element on the engine shaft while at the same time slow rotary motion is imparted thereto until the engaging movement has progressed to a point of completion, at which time a full supply of pressure fluid will be automatically admitted to the mechanism whereby said driving member is operated, so that then the latter will be rotated under its maximum power.

The invention has, also, for its object the provision, in connection with the rotatable element carried by the engine shaft, of an air motor which comprises a cylinder within which the pressure of the fluid will become effective in rotating the driving member, the entrance of said fluid into the cylinder being controlled by a valve the first part of its movement of which is caused by pressure fluid admitted thereto by a mechanism under the direct manual control of the person operating the engine, whereupon the valve will automatically uncover a port through which a full supply of pressure fluid will be admitted into the cylinder.

Further objects of the invention will hereinafter appear and be particularly defined in the claims.

The invention has been clearly illustrated in the accompanying drawings, in which similar characters denote similar parts, and in which—

Figure 1:
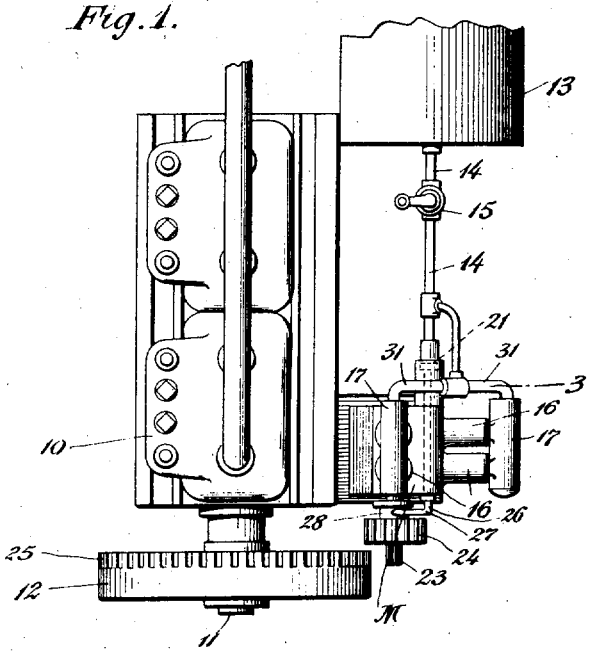
Figure 4:
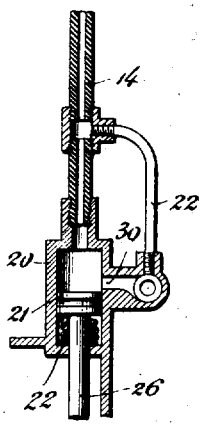
Figure 2:
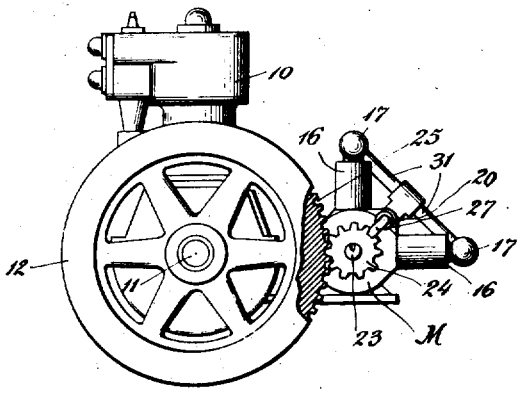
Figure 3:
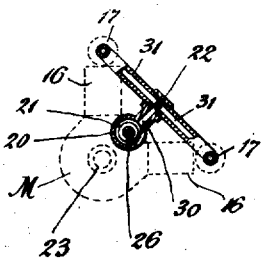

Figure 1 is a top view of a hydro-carbon engine equipped with my improved starter. Fig. 2 is an end view thereof, the fly-wheel being partly broken away. Fig. 3 illustrates a detail of the starting mechanism partially broken away in section on line 3, of Fig. 1, and Fig. 4 is an enlarged section of a portion of the starting device.

Referring to the drawings 10 denotes a hydro-carbon engine which may be of any desired construction, and the crank-shaft 11 of which is provided with a fly-wheel 12 which in the present instance constitutes the element upon which the starting device becomes effective in turning the engine over until the cylinders thereof receive the explosive spark. In the present instance the starting device is operated by compressed air contained within a tank 13 from which a supply pipe 14 leads past a valve 15 adapted to be manually-controlled by the operator of the engine.

The starting device proper consists of a motor M which may be of any desired construction and is herein shown as a multiple cylinder device, into the cylinder 16 of which pressure fluid is permitted to enter as controlled by valve chests 17 which extend over the air cylinders substantially in the manner shown in Fig. 1. Inasmuch as the particular construction of this air motor may be of any well known construction it is not deemed necessary to enter into the details thereof.

The supply pipe 14 is directly connected with one end of the cylinder 20, within which a piston 21 is reciprocable in one direction by the pressure fluid entering through said pipe, and in other direction by a spring 22 which normally maintains the piston 21 in the position shown in dotted lines in Fig. 1.

As has been above stated, one of the essential features of the present invention consists of the provision of means whereby a small stream of fluid under pressure will be first admitted to the cylinder of the air motor as soon as the control valve 15 has been operated with that end in view, this fine stream of fluid entering the cylinder 20 as well as a conduit 22 which is in constant open communication with the interior of the supply pipe 14 and then branches out to both of the valve chests above mentioned, thus supplying motive force to the air motor in a small quantity whereby the motor shaft 23 of said motor will therefore be slowly rotated. A pinion 24 is mounted for sliding movement upon the shaft 23 and is rotatable therewith, so that if said pinion is moved along on the shaft 23 it will come into engagement with gear teeth 25 provided on the fly wheel 12.

The means for sliding the pinion 24 consist preferably of the cylinder 20 and the piston 21 above mentioned, the piston rod 26 having at its forward end a bifurcated arm 27 the branches of which enter a groove 28 provided therefor in the hub of said gear. From the foregoing it will be understood that when the control valve 15 is opened, air under pressure will enter the cylinder 20, thus moving the piston rod 26, with the pinion, in a forward direction and therefore bringing the pinion and gear teeth 25 into engagement. At the same time, as has been stated above, rotary motion is imparted to the shaft 23 of the motor through the fine stream of air passing through the by-pass pipe 22 above referred to. The slow rotary motion is used solely for the purpose of bringing the gear teeth into engagement with each other without any undue shock to the mechanism, but after these teeth are once in sufficient engagement that the air motor may be operated in full speed and under maximum power, the further movement of the piston 21 is taken advantage of to uncover a port 30 in the cylinder 20 to permit a full supply of pressure air directly into the branch pipes 31 which lead to the valve chest 17, so that consequently air is then admitted to said valve chests for an amount equal to the area of the port plus the area of the by-pass pipe 22, under which conditions the motor will operate under its maximum power. As soon as the fly wheel 12 has thus been rotated, the utility of the air motor ceases, and the control valve 15 may be operated to shut off the supply of pressure air from the supply pipe 14 leading to the valve chest, whereupon the spring 22 will return the piston 21 to its normal position, thus withdrawing the piston 24 from the teeth 25 of the fly wheel.

From the foregoing description, the operation of my improved starter will be apparent, and it should be understood that many changes can be made in the general organization as well as in the particular construction of some of the component elements of my improved device, without departing from the spirit of the invention, particularly in the device whereby rotary motion is imparted to the pinion 24, and also in the mechanism whereby the differential rotary movements are imparted to the motor shaft 23.

I claim:—

1. The combination with a hydro-carbon engine comprising a crank shaft, and a disk secured thereto, of a fluid pressure supply, a motor operable thereby, a member rotatable by said motor and adapted to drive said disk, means for admitting a small stream of fluid under pressure to the motor for slowly rotating the same, a device shiftable by said pressure supply to rotatively connect said rotatable member and the disk and normally disconnecting same, and means for admitting a full supply of fluid under pressure to the motor upon a predetermined movement of said shiftable device into its "connecting" position.

2. The combination with a hydro-carbon engine comprising a crank shaft, and a disk secured thereto, of a fluid pressure supply, a motor operable thereby, a member rotatable by said motor and adapted to drive said disk, means for admitting a small stream of fluid under pressure to the motor for slowly rotating the same, a device shiftable by said pressure supply to rotatively connect said rotatable member and the disk and normally disconnecting same, and means for admitting a full supply of fluid under pressure to the motor upon a predetermined movement of said shiftable device into its "connecting" position, the admission of the small stream of fluid pressure and the movement of the shiftable device toward its "connecting" position being effected simultaneously.

3. The combination with a hydro-carbon engine, of an air motor, a fluid pressure supply, a cylinder, a conduit for conducting a small stream of fluid under pressure to said motor, a piston movable by said fluid supply in one direction in the cylinder to rotatably connect said engine and motor, a port in the cylinder normally closed by said piston and adapted to admit a full supply of fluid under pressure to said motor at a predetermined point of the connecting-movement of said piston under the action of the fluid under pressure, and means for admitting fluid pressure to said conduit and the cylinder simultaneously.

4. The combination with a hydro-carbon engine comprising a crank shaft, and a member secured thereto for co-rotation, of an air motor having a rotatable shaft, a wheel carried by said motor shaft, a fluid pressure supply, means for admitting a small stream of said fluid under pressure to the motor for slowly rotating said motor shaft, and means shiftable by said fluid under pressure for first bringing said wheel into engagement with said rotatable member and then admitting a full supply of fluid under pressure to said motor.

5. The combination with a hydro-carbon engine comprising a crank shaft, and a member rotatably connected therewith, of an air-motor comprising a rotatable shaft, a wheel carried by said motor-shaft, a fluid supply, a cylinder permanently connected with said fluid supply and having a port remote from said fluid inlet, a piston movable in said cylinder and adapted to uncover said port at a predetermined point of its movement, a conduit connecting said port with said motor, and means for connecting said piston with said wheel for shifting the latter longitudinally of the motor shaft to bring the same into engagement with the member of the crank shaft.

6. The combination with an internal combustion engine, of an air motor, a cylinder provided with a port adapted to lead into said air motor, a supply pipe leading into said cylinder and provided with a branch of relatively small bore having open communication with the cylinders of the air motor, a piston mounted in said cylinder and adapted to be moved in a direction to uncover the port of the cylinder by the pressure of air in the supply pipe, and means movable with said piston into operative relation with the engine to start the latter.

7. In mechanism of the character described, the combination of a motor provided with a fly wheel, an air motor, a cylinder having a port adapted to communicate with the air motor, a piston movable in said cylinder, a rod connected to said piston, the air motor being provided with a drive shaft, a pinion movable on said shaft and operatively connected to said rod whereby it will be moved by the latter into engagement with the fly wheel to drive the same, a supply pipe leading into the cylinder, a valve controlling said supply pipe and a branch pipe directly connected to the air motor and between the valve and the cylinder, for the purpose specified.

8. In mechanism of the character described, the combination of a main motor provided with a fly wheel, said fly wheel being formed on its periphery with gear teeth, of an air motor having a drive shaft, a pinion movable on said drive shaft into and out of engagement with the gear teeth of the fly wheel, a rod operatively connected to said pinion to move the same, a cylinder having a port, an air motor to which said port leads, a piston mounted in said cylinder and connected to said rod to move the same, the piston being adapted, at one point in its movement, to open said port leading to the air motor, a supply pipe leading into the cylinder, a valve carried by said supply pipe, and a by-pass connection from the supply pipe to the air motor between said valve and cylinder.

9. In mechanism of the character described, the combination of a main motor provided with a fly wheel, an air motor provided with a driving shaft, a pinion movable on said shaft into and out of engagement with the fly wheel, a rod operatively connected to said pinion to move the same, a cylinder having a port leading to the air motor, a supply pipe leading into said cylinder, a storage tank connected to the supply pipe, a manually operable valve in said supply pipe, a piston mounted in said cylinder and connected to said rod and adapted to uncover said port, a spring mounted in the cylinder and arranged to return the piston to normal position, and a by-pass connection from the supply pipe to the air motor between the valve and the cylinder.

WILLIAM L. STULLER.

Witnesses:
CHAS. F. SCHMELZ,
GEORGE W. SOULES.